US005455994A

United States Patent [19]

Termeer et al.

[11] Patent Number: 5,455,994

[45] Date of Patent: Oct. 10, 1995

[54] METHOD OF MANUFACTURING AN IN-THE-EAR HEARING AID

[75] Inventors: Petrus J. J. Termeer; Rudi A. M. Claes, both of Eindhoven, Netherlands

[73] Assignee: U.S. Philips Corporation, New York, N.Y.

[21] Appl. No.: 149,490

[22] Filed: Nov. 9, 1993

[30] Foreign Application Priority Data

Nov. 17, 1992 [EP] European Pat. Off. .............. 92203517

[51] Int. Cl.$^{6}$ ............................ B29C 33/40; B29D 17/00

[52] U.S. Cl. ............................................ 29/169.5; 264/222

[58] Field of Search ........................... 29/169.5; 264/220, 264/222; 381/68.6, 69, 69.1, 69.2

[56] References Cited

U.S. PATENT DOCUMENTS

| | | | |
|---|---|---|---|
| 3,097,059 | 7/1963 | Hoffman | 264/222 |
| 3,440,314 | 4/1969 | Frisch | 264/222 |
| 4,091,067 | 5/1978 | Kramer et al. | 264/222 |
| 4,735,759 | 4/1988 | Bellfiore | 264/222 |
| 5,201,007 | 4/1993 | Ward et al. | 381/68.6 |
| 5,321,757 | 6/1994 | Woodfill, Jr. | 381/69 |

FOREIGN PATENT DOCUMENTS

| | | | |
|---|---|---|---|
| 0533258 | 3/1993 | European Pat. Off. . | |
| 2120594 | 12/1983 | United Kingdom | 264/222 |

*Primary Examiner*—P. W. Echols
*Attorney, Agent, or Firm*—Bernard Franzblau

[57] ABSTRACT

In a method of manufacturing an in-the-ear hearing aid an auxiliary element, whose cross-section is larger than that of an auditory canal, is introduced into the auditory canal. As a result, the auditory canal is expanded. Subsequently, a hollow vent tube is inserted into the auditory canal, after which the auditory canal is filled with a viscous material. After the viscous material has solidified the mold is removed from the auditory canal. The vent tube insures that air is admitted to a space behind the mold. The mold thus formed has a cross-section larger than the cross-section of the auditory canal. Subsequently, a housing for the hearing aid is made, the mold being used as a template. Consequently, the heating aid will fit tightly in the auditory canal, which improves the wearing convenience. The auxiliary element used in this method has a cylindrical wall formed with a plurality of apertures to allow the passage of the viscous material to spaces between the auxiliary element and the wall of the auditory canal. The auxiliary element further comprises a sleeve for guiding the vent hose.

7 Claims, 3 Drawing Sheets

METHOD OF MANUFACTURING AN IN-THE-EAR HEARING AID

BACKGROUND OF THE INVENTION

This invention relates to a method of manufacturing an in-the-ear hearing aid which is worn in the auditory canal of a user in the proximity of his or her tympanic membrane. The hearing aid comprises a first part which, when the hearing aid is present in the auditory canal, is situated near the tympanic membrane in a first part of the auditory canal. This first part of the auditory canal has a substantially non-deformable wall. The hearing aid comprises a second part which, when the hearing aid is present in the auditory canal, is situated near an auricle in a second part of the auditory canal. The second part of the auditory canal has an elastic wall. In this method, first a mold of the auditory canal is made, then a housing for the hearing aid is made, the mold being used as a template, and subsequently components are mounted in the housing. The auditory canal is filled with a viscous material in order to make a mold of the auditory canal and the mold is removed from the auditory canal after solidification of said material.

A method of the type defined in the opening paragraph is described in the non-prepublished European Patent Application No. 92202781.8, which corresponds to U.S. application Ser. No. 943,366 filed Sep. 10, 1992. This method makes it possible to manufacture an in-the-ear hearing aid which precisely fits the auditory canal of a user. However, in order to be worn conveniently it is desirable that the hearing aid fits rather tightly in the auditory canal. Since the wall of the first part of the auditory canal is substantially non-elastic and the auditory canal is very sensitive at this location, the hearing aid cannot be fitted tightly in this part of the auditory canal. For this purpose the shape of the heating aid should be such that when present in the auditory canal the hearing aid causes a slight elastic deformation of the wall of the auditory canal. In order to determine the shape of the auditory canal in the deformed condition it is customary to make a further mold of the second part of the auditory canal, a paste-like substance being introduced into the auditory canal under pressure in a manner such that the wall of the auditory canal is deformed. This method does not allow a mold of the entire auditory canal to be made because the first part of the auditory canal is too sensitive to permit the paste-like substance to be applied under pressure. After the two molds have been made the two molds are cut to length and joined to one another. Joining is difficult because the exact shape of the transitional area between the first and the second part of the auditory canal, the second part being expanded, is not known.

SUMMARY OF THE INVENTION

It is one of the objects of the invention to provide a method of the type defined in the opening paragraph, which method enables a heating aid which fits tightly in an auditory canal of a user to be manufactured in such a way that its shape is accurately adapted to the auditory canal of which the wall of the second part has been deformed to provide a tight fit. To achieve this a characteristic feature of the method in accordance with the invention is that before the viscous material is introduced into the auditory canal an auxiliary element is introduced into the second part of the auditory canal so as to fit tightly therein and, when the auxiliary element is present in the second part of the auditory canal at the location of a cross-section of the auditory canal and the auxiliary element taken perpendicularly to the longitudinal direction of the auditory canal, at least one cross-sectional dimension of the auxiliary element is larger than a corresponding cross-sectional dimension of the second part of the auditory canal in the absence of the auxiliary element in the auditory canal. By means of an auxiliary element it is first determined which is the optimum position in the auditory canal for convenient wearing of the heating aid to be manufactured. The auxiliary element should then have at least the dimensions of the smallest heating aid. Since one mold is made of the entire auditory canal with the second part of the auditory canal being deformed this precludes the problems arising when different parts of the mould are cut to length and joined to one another, and a mold is obtained having exactly the same dimensions as the partly deformed auditory canal.

A further advantage of this method is that if the auditory canal of a user is too narrow for an existing hearing aid and consequently for the auxiliary element, the wall of the auditory canal will be expanded by the auxiliary element, as a result of which the space available in the auditory canal becomes larger. Thus, the mold represents the auditory canal in a partly expanded condition so that enough space is available for the introduction of the hearing aid.

In an embodiment of the method in accordance with the invention a hollow vent tube having a flange at one end is positioned with the flange near the tympanic membrane of the user before the viscous material is introduced into the auditory canal. This has the advantage that after the auditory canal has been filled with a viscous material and the material has solidified the vent tube admits air into a space behind the mold when the mold is removed from the auditory canal. As a result, no partial vacuum can be produced between the mold and the tympanic membrane, which could cause damage to the tympanic membrane.

In an advantageous embodiment a lubricant is applied to the wall of the auditory canal before the auxiliary element is introduced into the auditory canal. The lubricant may be an oil or a gel or another suitable viscous substance. The lubricant serves to facilitate removal of the mold from the ear after solidification.

It is also found to be advantageous to introduce a user identifier into the viscous material after the auditory canal has been filled with said viscous material and before said material has solidified. A "user identifier" is to be understood to mean any object capable of establishing the relation between user and the mould for the future. Suitable for this purpose is, for example, a textile tag provided, in advance or afterward, with a user identification such as name, user number etc. If desired, other data may be provided such as date, audiometrist identification etc.

The invention also relates to an auxiliary element for use in the method according to the invention. The auxiliary element comprises a cylindrical wall having a plurality of apertures to allow the passage of a viscous material for matting a mould of an auditory canal. Since the auxiliary element is not tailored to the auditory canal it may occur that the auxiliary element does not expand the auditory canal in all directions, so that parts of the wall of the auxiliary element will be spaced from the wall of the auditory canal. The wall of the auxiliary element has been provided with said apertures in order to ensure that the spaces between the wall of the auditory canal and the wall of the auxiliary element are also filled with the viscous material so that the hearing aid to be formed completely seals the auditory canal so as to preclude acoustic feedback.

In an embodiment of the auxiliary element in accordance with the invention, the auxiliary element has a passage for inserting and guiding a vent tube for admitting air behind the mold, which passage is formed by a sleeve connected to the wall. This has the advantage that the vent tube for the admission of air behind the mold can be passed through the sleeve, the vent tube then being situated in or near the centre of the auditory canal. This prevents the vent tube from being positioned against a wall of the auditory canal, so that the mold would not assume exactly the shape of the auditory canal. A further advantage of this is that the vent hose is slightly retained by the sleeve so that the flange is held against the tympanic membrane. This greatly reduces the likelihood of ingress of the viscous material between the flange and the tympanic membrane.

The invention further relates to a mold manufactured by the method in accordance with the invention wherein, when the mold is present in the second part of the auditory canal at the location of a cross-section of the auditory canal and the mold taken perpendicularly to the longitudinal direction of the auditory canal, at least one cross-sectional dimension of the mold is larger than a corresponding cross-sectional dimension of the second pan of the auditory canal in the absence of the mold in the auditory canal.

The invention moreover relates to a hearing aid manufactured by the method in accordance with the invention wherein, when the hearing aid is present in the second pan of the auditory canal at the location of a cross-section of the auditory canal and the hearing aid taken perpendicularly to the longitudinal direction of the auditory canal, at least one cross-sectional dimension of the hearing aid is larger than a corresponding cross-sectional dimension of the second pan of the auditory canal in the absence of the hearing aid in the auditory canal.

These and other aspects of the invention will become apparent from and elucidated on the basis of the embodiments described hereinafter.

BRIEF DESCRIPTION OF THE DRAWING

The invention will now be described in more detail, by way of example, with reference to the accompanying drawings. In the drawings.

DESCRIPTION OF THE PREFERRED EMBODIMENTS

Figure 1:
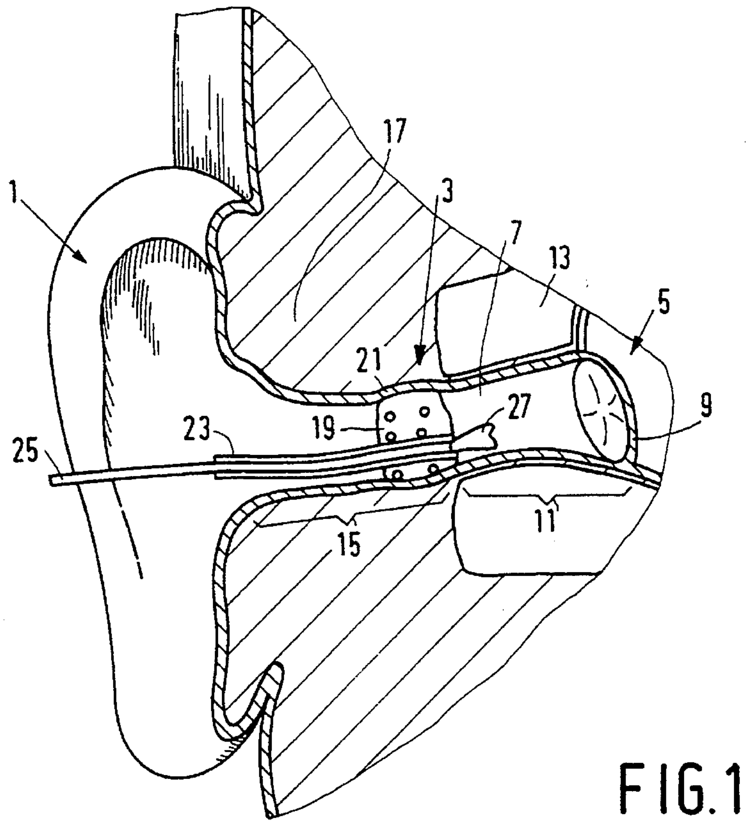
FIG. 1 is a longitudinal sectional view of an auditory canal in which is situated an auxiliary element with a vent tube having a flange.

First the method in accordance with the invention for making a mold of an auditory canal will be described with reference to FIGS. 1 to 4. FIG. 1 is a sectional view of a human organ of hearing. The organ of hearing may be divided into an auricle 1, a middle ear 5 and a part 3 situated between the auricle 1 and the middle ear 5. This part 3 comprises an auditory canal 7, which is separated from the middle ear 5 by a tympanic membrane 9. The auditory canal 7 comprises a first part 11 near the tympanic membrane 9, which first part has a wall formed by substantially non-deformable bone tissue 13, and a second part 15 near the auricle 1, which second part has a wall formed by elastic cartilage 17 and adipose tissue. An auxiliary element 19 is inserted into the second part 15 of the auditory canal 7. The auxiliary element 19 is positioned in such a way that it fits rather tightly in the auditory canal 7 so that the wall 21 of the second part 15 of the auditory canal 7 is partly expanded. The best fitting auxiliary element for the auditory canal can be selected by successively inserting some auxiliary elements of different sizes into the auditory canal. The auxiliary element has such a shape that it provides enough room to accommodate the necessary components of a hearing aid. Moreover, the auxiliary element is positioned so as to provide optimum wearing convenience. The auxiliary element 19 comprises a sleeve 23 which functions as a grip and as a guide for a vent tube 25. The vent tube 25 comprises a flange 27, which is partly folded inside the sleeve 23 during insertion of the auxiliary element 19. Prior to this, a lubricant has been introduced into the auditory canal.

Figure 2:
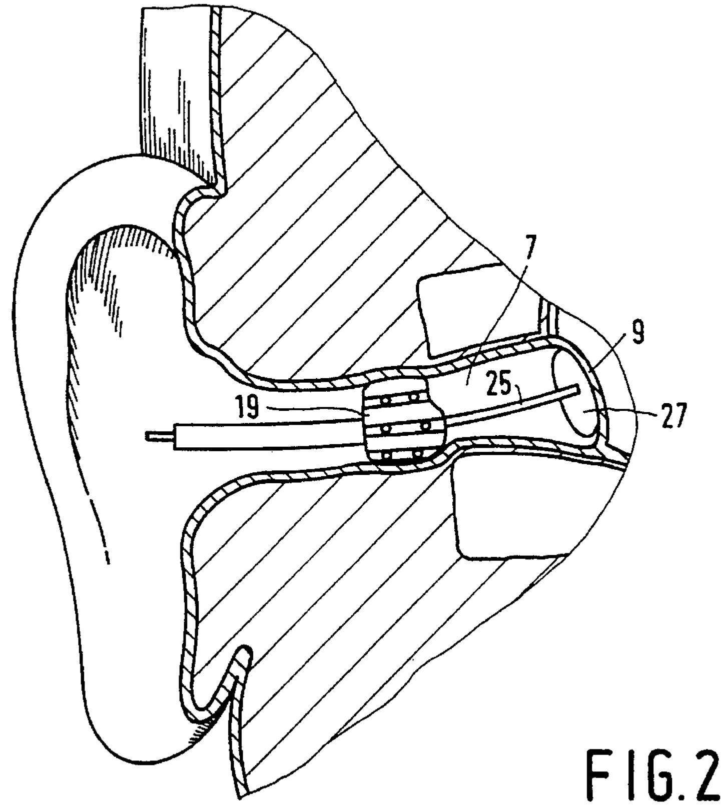
FIG. 2 shows the auditory canal with the auxiliary element, the vent tube being brought into the desired position.

FIG. 2 shows the auditory canal 7 with the auxiliary element 19 and the vent tube 25 situated therein, the vent tube 25 being positioned so that the flange 27 is against the tympanic membrane 9. After a mold of the auditory canal has been made the vent tube 25 ensures that during removal of the mold from the auditory canal the space between the tympanic membrane and the mold can communicate with the outer air. This is to prevent the formation of a partial vacuum in this space during the removal of the mold, which could lead to damage to the tympanic membrane.

Figure 3:
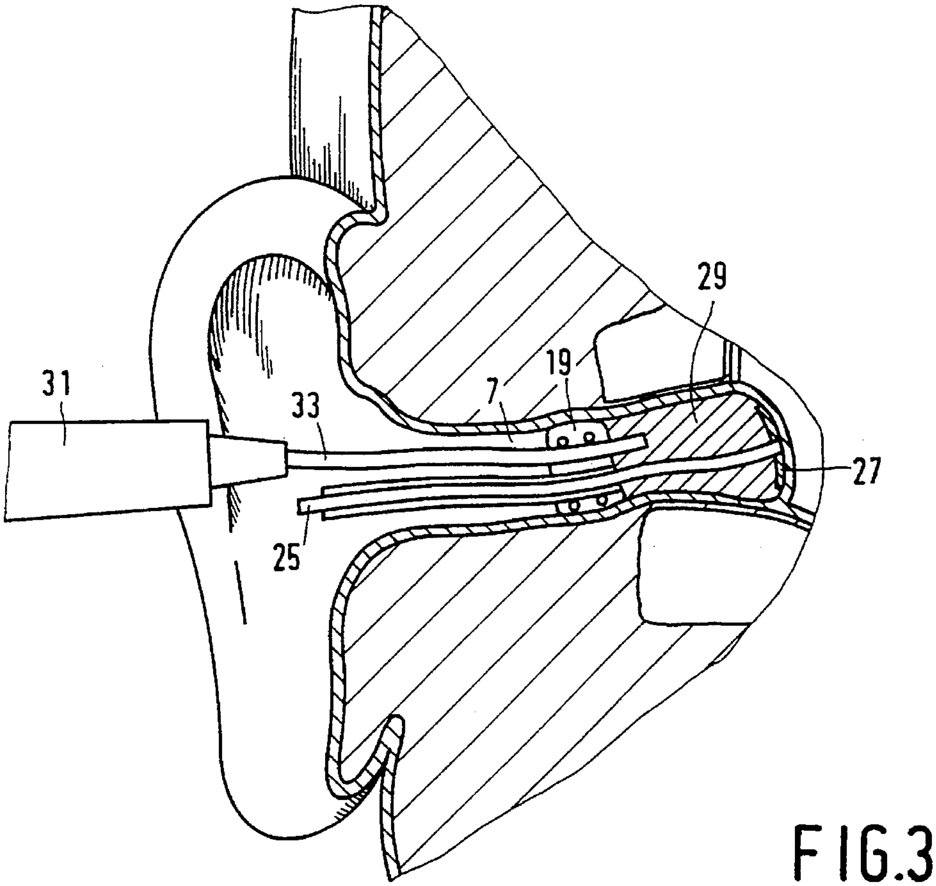
FIG. 3 shows the auditory canal with the auxiliary element and the vent tube while a mold of the auditory canal is being formed with the aid of a dispenser.
Figure 4:
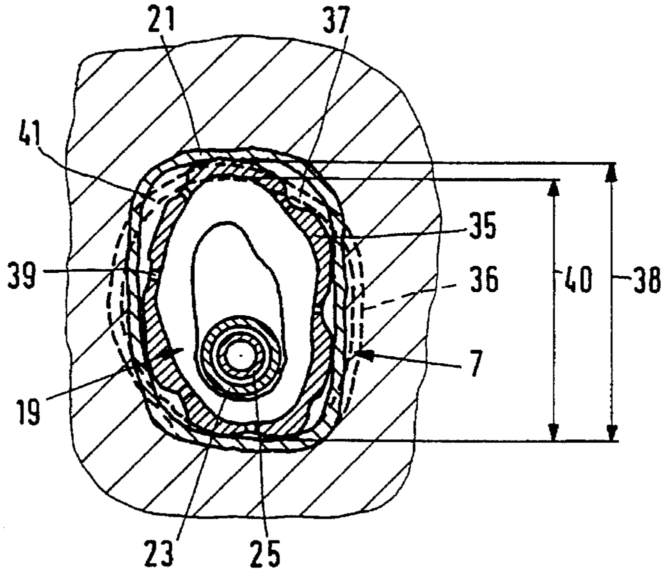
FIG. 4 is a cross-sectional view of the auditory canal in which the auxiliary element is situated.

FIG. 3 shows the situation while the auditory canal 7 is being filled with a viscous material 29. By means of a dispenser 31 this material 29 is injected into the auditory canal 7 via a tube 33 through a hole in the auxiliary element 19. The viscous material 29 may be, for example, a liquid two-component silicone rubber. The flange 27 ensures that the vent hose 25 cannot be obstructed by the viscous material 29 as the auditory canal 7 is being filled with the viscous material 29. During filling of the auditory canal 7 with the viscous material 29 the end of the vent hose 25 outside the auditory canal 7 is closed. As a result of this, an air column is situated inside the vent tube. If, nevertheless, viscous material should penetrate between the flange 27 and the tympanic membrane 9, this material can hardly get into the vent hose 25 owing to the presence of the air column, which further reduces the likelihood of the vent tube being obstructed. FIG. 4 is a sectional view taken perpendicularly to the longitudinal direction of the auditory canal, showing the auditory canal 7 with the auxiliary element 19 and the vent hose 25. The auxiliary element 19 has a cylindrical wall 35 and a sleeve 23 which functions, inter alia, as a grip. The outer surface of the wall 35 has grooves 37 and at the location of the grooves 37 the wall 35 has apertures 39. The apertures 39 and the grooves 37 serve to give the viscous material access to spaces 41 between the wall 21 of the auditory canal 7 and the wall 35 of the auxiliary element 19. These spaces 41 are formed because the auditory canal 7 does not assume exactly the shape of the auxiliary element 19. Since it is desirable that the hearing aid eventually has exactly the shape of the auditory canal in a partly expanded condition in order to preclude acoustic feedback, this means that the shape of the mold should be exactly similar to the shape of the auditory canal. Therefore, these spaces 41 should also be filled with the viscous material. After the auditory canal has been filled with the viscous material and the material has solidified the mold can be removed from the auditory canal. A broken line 36 represents the auditory canal in the absence of the auxiliary element in this auditory canal. The cross-sectional dimension 38 of the auxiliary element 19 is larger than the corresponding cross-sectional dimension 40 of the second pan of the auditory canal 7 in the absence of the auxiliary element in this auditory canal. As a result of this, the wall 21 of the auditory canal is deformed when the auxiliary element 19 is introduced so that the auxiliary element 19 tightly fits the auditory canal 7.

Figure 5:
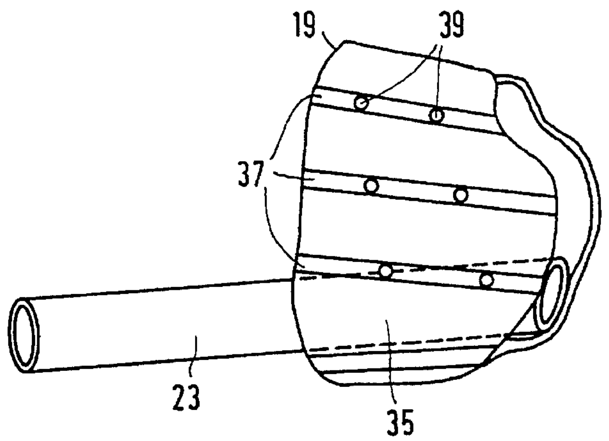
FIG. 5 shows an auxiliary element of a hearing aid in accordance with the invention.

FIG. 5 shows the auxiliary element 19 of a part of an in-the-ear heating aid, which element is used to make a mold of an auditory canal. The auxiliary element 19 is open at both ends. The outer surface of the wail 35 has grooves 37 and at the location of the grooves 37 the wail 35 has apertures 39 for the passage of the viscous material. The sleeve 23, which functions as a grip and as a guide for the vent tube, is connected to the wail 35 of the auxiliary element.

Figure 6:
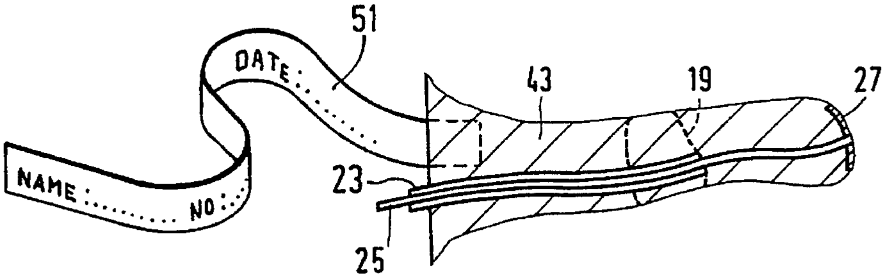
FIG. 6 shows a mold manufactured by means of the method in accordance with the invention and comprising the auxiliary element.

FIG. 6 shows a mold 43 manufactured by means of the method described above. The vent tube 25 with the flange 27 and the auxiliary element 19 with the sleeve 23 form a part of the mold. The mold 43 is used as a template in making the housing of an in-the-ear hearing aid, the auxiliary element 19 defining the space for accommodating the electronic modules. The mold now indicates the correct position of the hearing aid in the auditory canal, which obviates often difficult and therefore error-introducing choices in the manufacture of the hearing aid. The mold 43 has been provided with a user identifier in the form of a textile tag 51. This tag may also be used during the removal of the mold from the ear.

Figure 7:
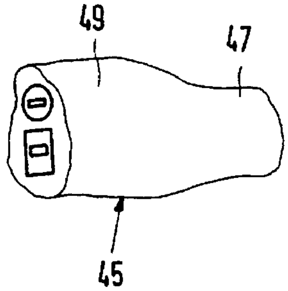
FIG. 7 shows a hearing aid manufactured by means of the method in accordance with the invention.

FIG. 7 shows a heating aid 45 whose shape has been adapted to that of the mold shown in FIG. 6. The heating aid 45 comprises a first part 47, which in use is situated near the tympanic membrane in the first part of the auditory canal, and a second part 49, which in use is situated near the auricle in the second part of the auditory canal. The first part 47 accommodates a receiver and the second part 49 accommodates the other components such as a microphone, an amplifier and a battery.

Although the invention has been described above with reference to the drawings, it is to be noted that the invention is not limited to the embodiments shown in the drawings. The invention also extends to ail methods and ail embodiments which deviate from those shown in the drawings and discussed so far but fall within the scope of the Claims. Thus, in contradistinction to what is shown in the drawings, the auxiliary element may be situated near the auricle in the second pan of the auditory canal instead of substantially in the middle of the auditory canal. No lubrication of the ear canal may be needed if the material from which the mold is made has lubricating properties by of itself. The user identifier need not be a textile tag but may be any object serving the purpose of identifying the person to which the mold belongs. It may be entirely embedded in the mold.

We claim:

1. A method of manufacturing an in-the-ear hearing aid to be worn in an auditory canal of a user and in proximity to a tympanic membrane, wherein the hearing aid comprises a first part which, when the hearing aid is present in an auditory canal, is situated near the tympanic membrane in a first part of the auditory canal, which first part of the auditory canal has a substantially non-deformable wall, and wherein the hearing aid comprises a second part which, when the hearing aid is present in the auditory canal, is situated near an auricle in a second part of the auditory canal, which second part of the auditory canal has an elastic wall, said method comprising: as a first step, making a mold of the auditory canal, then making a housing for the hearing aid using the mold as a template, and subsequently mounting components in the housing, the first step further comprising, filling the auditory canal with a viscous material in order to make the mold of the auditory canal, removing the mold from the auditory canal after solidification of said material, wherein, before the viscous material is introduced into the auditory canal, introducing an auxiliary element into the second part of the auditory canal so as to fit tightly therein, and wherein, when the auxiliary element is present in the second part of the auditory canal at the location of a cross-section of the auditory canal, the auxiliary element, taken perpendicularly to the longitudinal direction of the auditory canal, has at least one cross-sectional dimension thereof which is larger than a corresponding cross-sectional dimension of the second part of the auditory canal in the absence of the auxiliary element in the auditory canal.

2. A method as claimed in claim 1, further comprising: positioning a hollow vent tube having a flange at one end in the auditory canal with the flange near the tympanic membrane of the user before the viscous material is introduced into the auditory canal.

3. A method as claimed in claim 1, further comprising: applying a lubricant to the wall of the auditory canal before the auxiliary element is introduced into the auditory canal.

4. A method as claimed in claim 1, further comprising: introducing a user identifier into the viscous material after the auditory canal has been filed with said viscous material and before said material has solidified.

5. A method of making a mold for a housing of an in-the-ear hearing aid adapted to be positioned in proximity to a tympanic membrane in the auditory canal of a user of the hearing aid, said method comprising:

introducing an auxiliary element into a part of the auditory canal which has an elastic wall, said auxiliary element having an approximately complementary shape to the wall of said part of the auditory canal and with at least one cross-sectional dimension of the auxiliary element being greater than a corresponding cross-sectional dimension of the elastic wall of said part of the auditory canal, said auxiliary element having apertures in a wall thereof and having a hollow vent tube extending through the auxiliary element and through an end of the auxiliary element adapted to face the tympanic membrane, said vent tube having a flange at a first end thereof near said end of the auxiliary element, inserting said flange into the proximity of the tympanic membrane, introducing a viscous material into the auditory canal through said auxiliary element and the apertures therein so as to fill a part of the auditory canal in the vicinity of the auxiliary element and up to the tympanic membrane, allowing said viscous material to solidify, and removing the auxiliary element and solidified mold from the auditory canal.

6. The method as claimed in claim 5 further comprising, prior to introducing the viscous material into the auditory canal, closing a second end of the vent tube to so as to form an air column within the vent tube such as to prevent ingress of viscous material into the vent tube via an opening in said first end thereof.

7. The method as claimed in claim 6 further comprising, after solidification of the viscous material and prior to removal of the auxiliary element and mold, opening said closed second end of the hollow vent tube.

* * * * *